June 5, 1923.

A. MOETTELI 1,457,713

COKE QUENCHING PROCESS

Filed July 19, 1920

INVENTOR
Arnold Moetteli
BY
Chas. J. O'Neill
atty.

Patented June 5, 1923.

1,457,713

UNITED STATES PATENT OFFICE.

ARNOLD MOETTELI, OF OBER-WINTERTHUR, SWITZERLAND.

COKE-QUENCHING PROCESS.

Application filed July 19, 1920. Serial No. 397,400.

*To all whom it may concern:*

Be it known that I, ARNOLD MOETTELI, a citizen of the Swiss Confederation, residing at Ober-Winterthur, Switzerland, have invented certain new and useful Improvements in Coke-Quenching Process (for which I have filed an application for a patent in Germany July 7, 1919), of which the following is a specification.

This invention relates to a process for cooling the hot residues from a number of distilling vessels with utilization of the heat contained in the residues and consisting in collecting the hot residues, instead of bringing the same from each individual distilling vessel into a separate cooling vessel as has been done hitherto, in a common cooling vessel adapted to be emptied successively, for the purpose to ensure a continuous and approximately constant supply of heat from the residues coming from the different distilling vessels.

In the accompanying drawing the invention is shown by way of example.

$a$ designates a battery of coke ovens with the vertical distilling retorts $b$, $c$ is the cooling vessel for collecting the coke from all retorts and $d$ is a transporting receptacle provided with a discharging device $e$, which receptacle can be carried below all the retorts by means of a truck $f$ to be raised above the cooling vessel with the aid of the hoist $h$ adapted to run on rails $g$. After the completion of the distilling process the retorts are emptied separately or in groups into the receptacle $d$. This receptacle is lifted upon the cooling vessel by means of the hoist and emptied into said vessel whereupon it is loaded again, this being repeated as often as necessary. The heat can be drawn off and carried to the places where it is to be utilized by means of a gas-current circulating through the residue and passing through a device $k$ for exchanging the heat, here a steam boiler; the successive removal of the residues which have been cooled already and which form the lower layers in the vessel, being effected by opening an outlet or discharging device $z$ which is arranged in the bottom of the cooling vessel. The heat which has been drawn off from the residues can be used for the generation of steam or for similar purposes. In comparison with the known methods, according to which the residues from one distilling vessel are emptied into a separate cooling vessel, said cooling vessels having to be completely emptied before a new charge of residues can be put in, so that the supply of heat to the place where it is to be utilized is intermittent and cannot be regulated according to requirement, the process according to this invention has the advantage that it ensures a continuous, approximately uniform supply of heat from the residues coming from the different distilling vessels. The inert cooling medium is introduced through a pipe $r$ by means of a centrifugal blower $p$, and is withdrawn through pipe $s$. The heated medium is passed through a steam boiler such as shown at $k$, and returned again to the blower $p$.

Figure 1:
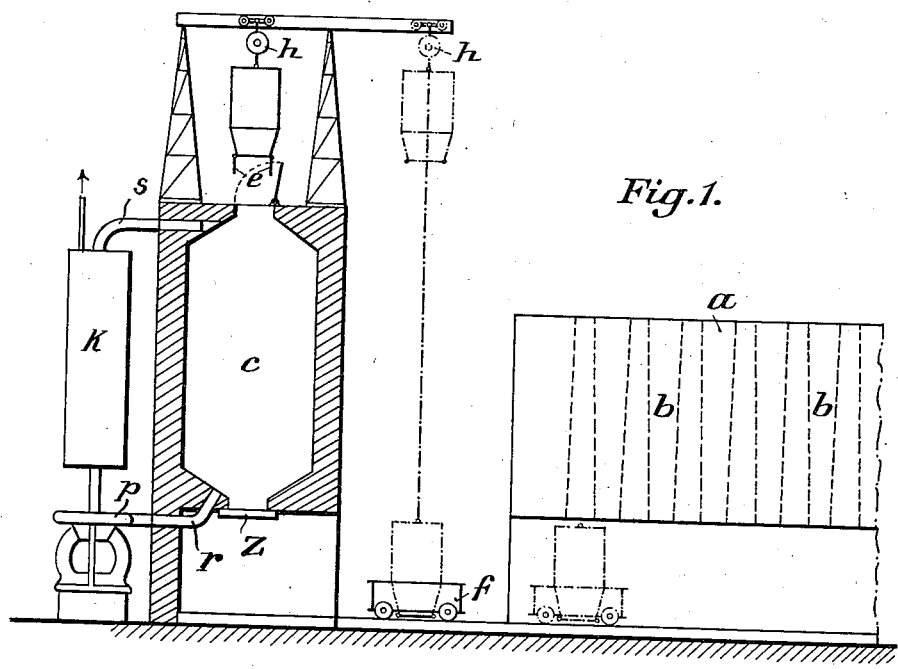
Fig. 1 shows in elevation a plant for cooling coke with the distilling ovens.
Figure 2:
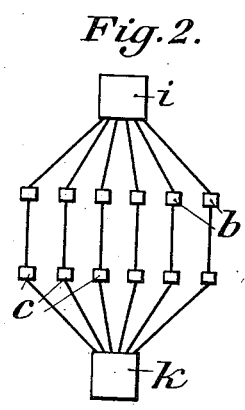
Fig. 2 is a diagram of the process as used at present.
Figure 3:
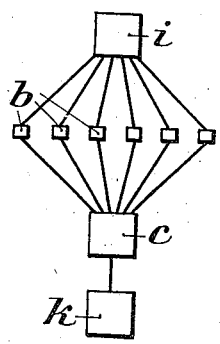
Fig. 3 illustrates in a diagram the process according to this invention.

In Figures 2 and 3 which permit to compare the known process with the process according to this invention, the storing receptacles for the material to be distilled are designated by $i$; the distilling vessels by $b$, the cooling vessel for the residues from distillation by $c$, and the place where the heat is to be utilized, e. g. the boiler, by $k$. Whilst according to the process used hitherto, the heat is supplied intermittently from the distilling vessels to the place where it is to be utilized; this heat is, according to the improved process, collected as soon as it gets out of the distilling vessels, in a common vessel $c$ to be supplied to the place where it is to be utilized according to requirement. If there are a great number of distilling ovens there could of course be used two or three cooling vessels instead of the common cooling vessel hereinbefore described, each cooling vessel serving for a separate group of coke ovens.

I claim:—

1. The process of cooling the hot residues from a plurality of distilling vessels with recovery of the heat contained within the residues, characterized in that the hot residues at obviously varying temperatures from a plurality of distilling vessels are cooled in a common receptacle or cooling vessel large enough to receive the whole contents of said distilling vessels, for the purpose of storing up the residues and equalizing the temperature thereof, whereby a constant and uniform supply of heat may be obtained and the cooled or cooling residues may be removed at will.

2. The process for cooling the hot residues from a plurality of distilling vessels with recovery of the heat contained within the residues, comprising emptying the hot residues of obviously varying temperatures from a plurality of distilling vessels into a common receptacle large enough to receive the contents from more than one of said distilling vessels, storing and equalizing the temperatures of said residues in said receptacle, cooling the said residues in said receptacle by a heat exchange, and removing the cooled residues from said receptacle.

In testimony whereof I affix my signature in the presence of two witnesses.

ARNOLD MOETTELI.

Witnesses:
EMMA MAURER,
J. A. DuBois.